April 3, 1951 T. H. HOLMES 2,547,578
POWER TRANSMISSION SYSTEM
Filed Sept. 15, 1945 3 Sheets-Sheet 1

FIG. 1

INVENTOR.
TRENT H. HOLMES
BY
Lester W Clark
AGENT

April 3, 1951 T. H. HOLMES 2,547,578
POWER TRANSMISSION SYSTEM
Filed Sept. 15, 1945 3 Sheets—Sheet 3

INVENTOR.
*Trent H. Holmes*
BY
*Lester W Clark*
AGENT

Patented Apr. 3, 1951

2,547,578

UNITED STATES PATENT OFFICE 2,547,578

POWER TRANSMISSION SYSTEM

Trent H. Holmes, Middletown, Conn., assignor, by mesne assignments, to Niles-Bement-Pond Company, West Hartford, Conn., a corporation of New Jersey Application September 15, 1945,
Serial No. 616,519½

28 Claims. (Cl. 60—19)

The invention relates particularly to a power system including an internal combustion engine and adapted for use in or as a part of a motor vehicle, but as to some of its aspects it is not necessarily so limited.

It is well known that an internal combustion engine operates most efficiently with the pressure in the intake manifold thereof at a predetermined optimum, the efficiency of the engine being substantially reduced when the pressure in the manifold is permitted to rise above or fall below the said optimum. An important object of the present invention is to provide a power system wherein the speed ratio between the engine and vehicle wheels or other driven members is automatically varied so as to cause the engine to operate at such a speed as to enable the manifold pressure to remain substantially constant and at the said predetermined optimum. An increase in manifold pressure above the optimum causes a change in the speed ratio between the engine and the driven members with resultant increased engine speed which serves to restore the manifold pressure to the optimum. Similarly, a decrease in manifold pressure below the optimum causes a change in the speed ratio between the engine and the driven members with resultant decreased engine speed which serves to restore the manifold pressure to the optimum.

While the automatic change of speed ratio to maintain the manifold pressure at optimum is highly desirable throughout normal operating speeds, it may be less desirable or even undesirable during starting and at low speeds. A further object of the invention is to provide automatic means for preventing the operation of the said automatic means for changing of the speed ratio when the speed of the vehicle is below a predetermined critical speed and for then maintaining a speed ratio which is relatively high.

A hydraulic power transmission system between the engine and the vehicle wheels or other driven members is highly desirable and a further object of the invention is to provide in a power system of the type described, a hydraulic power transmission including a variable capacity pump and automatic means for changing the capacity of the pump to effect the desired changes in speed ratio.

It is necessary in a motor vehicle for the engine to operate at a relatively low idling speed when the vehicle is stationary, and a further object of the invention is to provide a by-pass in the hydraulic connections having an idle valve therein adapted to be opened to permit the pump to operate without load. Preferably the idle valve is operable in unison with the engine throttle, so that the valve is automatically moved to its open or by-passing position when the throttle is closed or substantially closed to enable the engine to operate at idling speed.

It is desirable to prevent the vehicle from moving backward after having been stopped on a grade, and a further object of the invention is to incorporate in the hydraulic power transmission a suitable means for accomplishing this result.

It is necessary for provision to be made for operating the vehicle not only in the forward direction but also in the reverse direction and a further object of the invention is to incorporate in the hydraulic transmission means causing the movement in reverse direction to be substantially slower than movement in the forward direction.

Ordinarily the speed ratio of the power transmission should be higher during reverse movement than during forward movement, and a further object of the invention is to incorporate means in the hydraulic transmission for automatically effecting such higher speed ratio during travel in the reverse direction.

It is desirable to provide means whereby the vehicle may travel freely under inertia or by reason of a downgrade without any retarding or braking being effected by the engine, this being commonly known as free-wheeling. A further object of the invention is to incorporate in the hydraulic transmission certain improved features which serve in combination with other features to facilitate free-wheeling.

Other objects and advantages of the present invention will be apparent from a consideration of the appended specification, claims and drawings in which:

Figure 1:
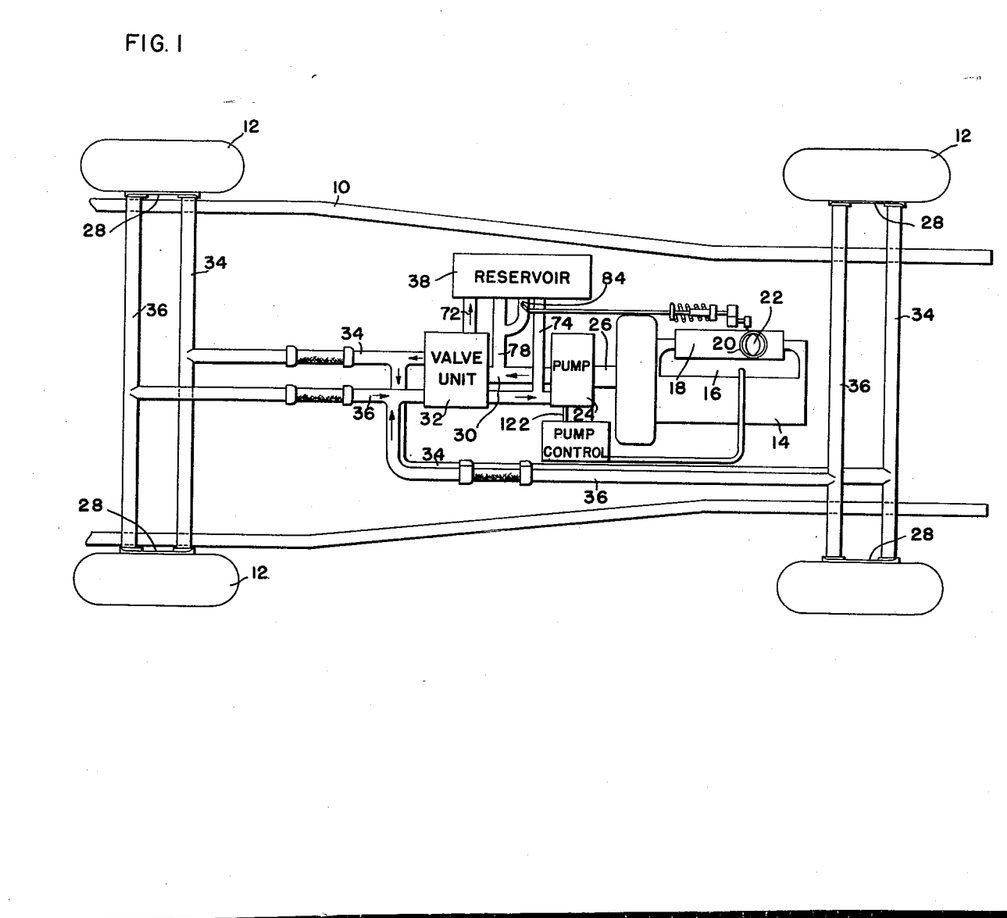
Fig. 1 is a diagrammatic plan view showing the frame, the wheels and the power system of a motor vehicle.

Referring to the drawings, the frame of the motor vehicle is shown at 10 and the wheels thereof are shown at 12, 12. Any usual or preferred brakes, not shown, may be provided. Power for driving the motor vehicle is derived from an internal combustion engine 14 having an intake manifold 16 and a carburetor 18. Air is admitted to the carburetor 18 through an air intake duct 20 having a throttle 22 therein.

The engine 14 is operatively connected with the vehicle wheels 12, 12 by means of a suitable variable speed power transmission. While the invention is not necessarily so limited, a power transmission of the hydraulic type has many advantages, and such a transmission is shown. It includes a variable capacity pump 24 which delivers fluid, such as oil or glycerine, to operate fluid motors 28, 28 mechanically connected with and preferably incorporated in the wheels 12, 12. The several motors 28, 28 will be referred to collectively as "motor means." Fluid is delivered from the pump through a conduit 30 to a valve unit 32 and fluid is delivered from the valve unit to the several wheel motors through a plurality of conduits 34, 34. The fluid, after passing through the motors, is returned to the valve unit 32 through a plurality of conduits 36, 36. The returning fluid is delivered from the valve unit back to the pump either through a reservoir 38 or directly, as will be hereinafter more fully explained.

Figure 2:
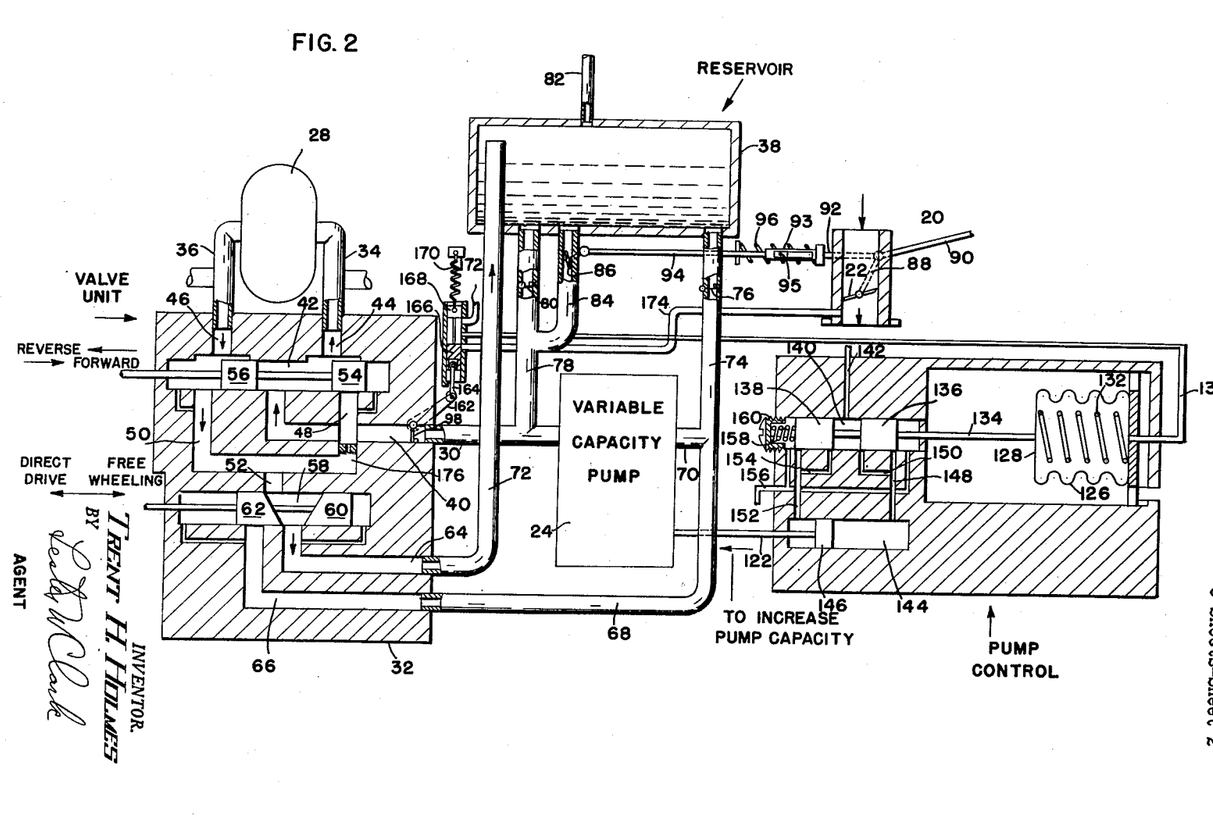
Fig. 2 is a diagrammatic view showing the power system.

The valve unit 32, shown diagrammatically in Fig. 2, has a conduit 40 which is connected with the conduit 30 leading from the pump 24 and which extends to a valve chamber 42. Conduits 44 and 46 connect the chamber 42 respectively with the conduits 34, 34 and 36, 36. Leading from the chamber 42 are two return conduits 48 and 50 which communicate with a single return conduit 52. Located in the chamber 42 is a manually movable reversing valve having two plungers 54 and 56 spaced apart but connected to move in unison. When the reversing valve is in its right hand position, as shown in the drawing, the plunger 56 blocks communication from the chamber 42 to the conduit 46, but communication is established from the chamber 42 to the conduit 44 so that fluid can move through the fluid motors for operating the vehicle in the forward direction. With the reversing valve in this position the return conduit 48 is blocked by the valve plunger 54 but the conduit 50 is open for the passage of return fluid passing through the conduit 46.

It will be clear that when the reversing valve is moved to its left hand position, the plunger 54 will block the passage from the chamber 42 to the conduit 44 and that the plunger 56 will block the passage to the return conduit 50. In this position fluid can flow from the chamber 42 to the conduit 46 and return fluid can flow from the conduit 44 to the conduit 48. Thus the fluid can move through the fluid motors to operate the vehicle in the reverse direction.

Provision is made for permitting free-wheeling, but the free-wheeling is optional and can be utilized or made inoperative by means of a manually operable free-wheeling valve movable in a chamber 58 with which the conduit 52 communicates. The valve comprises two plungers 60 and 62 spaced apart but connected to move in unison. When the valve is in its right hand position, as shown in the drawing, the return conduit 52 is connected with the conduit 64 and free-wheeling is possible, as will be presently explained. When the free-wheeling valve is in its left hand position the return conduit 52 is connected with the conduit 66 and free-wheeling is eliminated, the wheel motors being connected directly with the pump. The direct drive conduit 66 connects with a conduit 68 which in turn connects with a conduit 70 leading directly to the intake side of the pump 24.

When the free-wheeling valve is in the position shown, the fluid returned from the wheel motors flows through the conduit 64 and through a connected conduit 72 which is connected with the intake side of the pump. Preferably, and as shown, the conduit 72 does not extend directly to the pump but discharges into the fluid reservoir 38. From the reservoir the fluid flows to the intake side of the pump through a conduit 74. A check valve 76 in the conduit 74 prevents fluid from flowing through the conduit 74 in the reverse direction when the free-wheeling valve is in the left hand or direct drive position.

During free-wheeling the wheel motors may run at speeds above the speed at which they would be driven by fluid delivered from the pump, and in this case the wheel motors themselves act as pumps to circulate the fluid more rapidly than it would be circulated by the main pump. To permit the surplus fluid pumped by the motors to be freely circulated without retarding the vehicle movement, a by-pass is provided so that the surplus fluid can pass directly from the free-wheeling return conduit 72 to the delivery side of the pump. This by-pass may be variously located, but as shown, it consists of a conduit 78 connected between the reservoir 38 and the conduit 30. A check valve 80 is provided in the conduit 78 to prevent fluid from flowing therethrough in the reverse direction when the wheel motors are not rotating freely but are being driven by fluid supplied from the pump.

It will be seen that during free-wheeling the fluid pumped by the wheel motors flows through the conduits 64 and 72 to the reservoir. Some of the fluid delivered to the reservoir passes through the conduit 74 past the check valve 76 to the pump 24 to meet the requirements of the pump for the conditions under which it may be operating. Surplus fluid that is not required by the main pump will flow through the conduit 78 past the check valve 80 to the conduit 30 and through the last said conduit back to the wheel motors.

In order to avoid building up any pressure in the reservoir 38, the reservoir is provided with a vent 82 connected with the atmosphere.

When the vehicle is stationary, and also during free-wheeling, it is necessary for the engine to operate at a slow idling speed and in order that the engine may so operate it is necessary for the load to be removed from the pump 24 which is directly connected with the motor. To this end, a by-pass connection is provided around the pump with a valve therein adapted to be opened to permit idling of the motor. This by-pass connection may be variously located, but as shown, it comprises in part a conduit 84 connected with the conduit 78 ahead of the check valve 80 and also connected with the reservoir 38. The by-pass connection further includes the before-mentioned conduit 74 leading from the reservoir 38 to the intake conduit 70 of the pump. The idle valve is shown at 86 and it is preferably connected to be automatically opened when the throttle is moved to its nearly closed position corresponding to the operation of the engine at idling speed. The valve 86 is mechanically connected with a lever 88 and a link 90 which serve to operate the throttle 22. Connected to the lever 88 is a link 92 having a sleeve 93 which telescopically engages a link 94 pivotally connected to a lever which operates the idle valve 86. A compression spring 96 engages the links 92 and 94 and tends to hold them in their relatively extended positions. The link 94 carries a cross pin 95 entering slots in the sleeve 93 to limit relative movement of the link toward the left. When the throttle is moved in the opening direction from the idling position shown, the links 92 and 94 move in unison and the idle valve 86 is immediately closed. Continued movement of the throttle in the opening direction serves to compress the spring 96, the link 92 moving relatively to the link 94. Thus, the throttle can be opened to any desired extent without further movement of the idle valve. When the throttle moves from its fully open position toward its closed position, the idle valve is held closed by the spring 96 until the throttle approaches its closed position, but thereupon the link 94 is moved with the link 92 and the idle valve is opened.

When the vehicle is stopped on an upgrade, the idle valve is open and unless proper provision is made to prevent such action, the vehicle would start to move by gravity in the direction opposite to that in which it had been travelling, the wheel motors serving as pumps to force the liquid in the direction opposite to that in which it would be circulated by the pump. To prevent such retrograde movement, an automatically acting valve is located in one of the conduits between the pump and the motors. This valve may be variously located but when there are alternative return conduits for direct drive and for free-wheeling, the valve is preferably located between the delivery side of the pump and the motors. As shown, there is a valve 98 in the conduit 40, this being a check valve which automatically opens to permit the flow of liquid to the wheel motors, but which is automatically closed when no fluid is flowing through the said conduit. This valve therefore serves to prevent any retrograde movement of the vehicle excepting such limited movement as might be possible on account of slippage in the wheel motors themselves.

Figure 4:
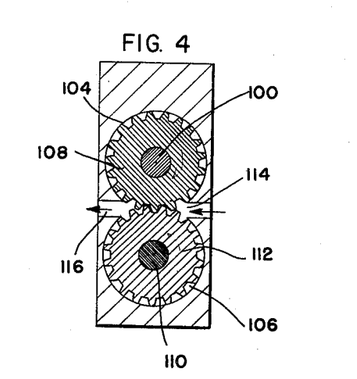
Fig. 4 is a transverse sectional view taken along the line 4—4 of Fig. 3.
Figure 5:
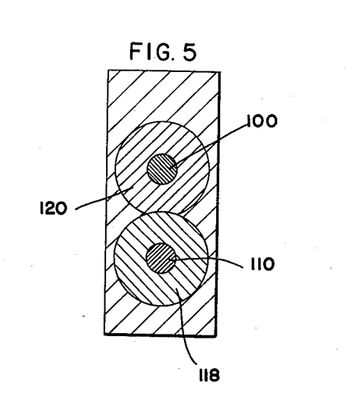
Fig. 5 is a transverse sectional view taken along the line 5—5 of Fig. 3.

In order to vary the speed ratio between the engine and the vehicle wheels the pump 24 is so constructed that its capacity is variable, the required variations in speed ratio being obtained by varying the capacity of the pump. The details of the pump constitute no part of the present invention and any suitable type of variable capacity pump may be used. However, in Figs. 3 to 5, I have shown by way of illustration a variable capacity pump of a type which may be used.

Figure 3:
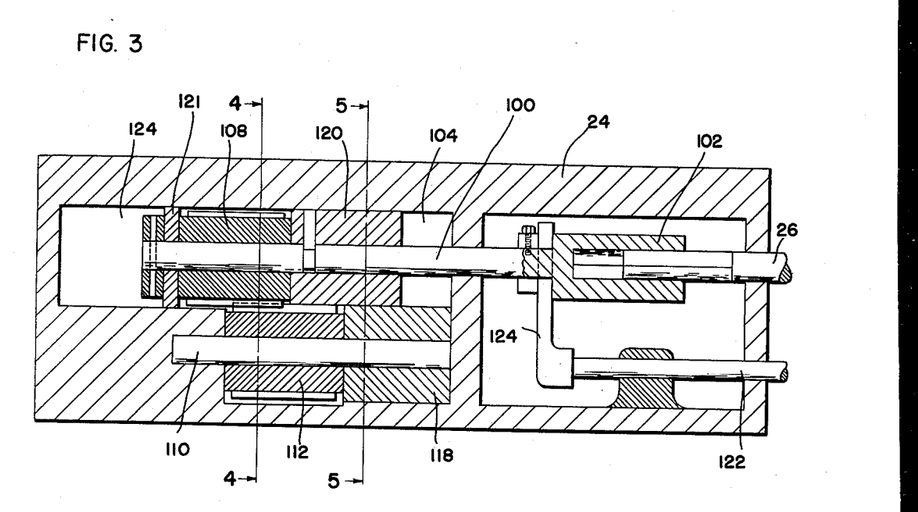
Fig. 3 is a longitudinal sectional view, largely diagrammatic, through a variable capacity pump such as may be used as a part of the power transmission.

The pump has a main shaft 100 which is driven from the main engine shaft 26 through a telescopic connection 102 which permits the shaft 100 to be moved endwise relatively to the shaft 26. The shaft 100 extends into a cylindrical chamber 104 which communicates with a parallel intersecting cylindrical chamber 106. Connected with the shaft 100 for rotation therewith is a gear 108, the outer diameter of the teeth of which is the same as the diameter of the chamber 104. Positioned in the chamber 106 and mounted on a shaft 110 is a gear 112, the outer diameter of the teeth of which is the same as the diameter of the chamber 106. The gears 108 and 112 mesh with each other and cooperate to form a gear pump. With the gears rotating in the directions indicated in Fig. 4 fluid is drawn in through an intake duct 114 connected with the intake conduit 70 shown in Fig. 2 and the fluid is discharged through a discharge duct 116 communicating with the discharge conduit 30 shown in Fig. 2.

Positioned in the chamber 106 and serving as a bearing for the shaft 110 is a cylindrical member 118, the upper portion of which extends into the chamber 104. Positioned in the chamber 104 immediately adjacent the gear 108 and connected with the shaft 100 to move longitudinally therewith is a member 120 which is cylindrical except at the bottom where it is provided with a recess having a concave cylindrical surface to receive and fit the upper projecting portion of the cylindrical member 118. At the other end of the gear 108 and also longitudinally movable therewith is a cylindrical member 121. The two members 120 and 121 serve to block the ends of the spaces between the gear teeth.

For moving the shaft 100 longitudinally and also the gear 108 and the members 120 and 121, there is provided a longitudinally movable rod 122. The rod 122 carries a shipper arm 124 which fits between two annular shoulders on the shaft 100. When the rod 122 is moved longitudinally by the means to be described, the shaft 100 and the parts carried thereby are similarly moved and the gear 108 is moved longitudinally relatively to the gear 112. When the gear 108 is fully in register with the gear 112 the capacity of the pump is at its maximum. However, when the gear 108 is moved toward the left from its fully registering position, the capacity of the pump is gradually reduced until some predetermined minimum capacity is reached with the gears in mesh to a very limited extent only. It will be seen that as the gear 108 moves out of complete mesh with the gear 112 the walls of the chamber 104 block off increasingly greater portions thereof, and at the same time the member 120 serves to block off increasingly greater portions of the gear 112. Thus the rate of pumping and the capacity of the pump are reduced.

In the operation of an internal combustion engine it is essential for maximum efficiency that the pressure in the intake manifold be maintained as closely as possible at a predetermined optimum pressure. The pressure in the manifold is the net result of two different factors, one factor being the inflow of air through the air duct tending to raise the manifold pressure to atmospheric pressure, and the other factor being the suction of the engine tending to reduce the manifold pressure substantially below atmospheric pressure. Obviously, the engine suction varies approximately in proportion to the engine speed. In accordance with the present invention means is provided for automatically adjusting the power transmission to change the ratio between the engine speed and the speed of the vehicle wheels or other driven members so as to maintain the manifold pressure at a predetermined optimum, notwithstanding different degrees of throttle opening and different load conditions.

With the throttle in a given position, the manifold pressure may rise above the predetermined optimum as the result of increased load or resistance. If the power transmission is of the hydraulic type as described, the capacity of the pump is thereupon automatically decreased, thus giving the engine increased mechanical advantage with respect to the vehicle wheels or other driven members. The speed of the engine is thus increased with resultant increased suction which reduces the manifold pressure to optimum. Similarly, with the throttle in a given position, the manifold pressure may fall below the predetermined optimum as the result of decreased load or resistance, and the capacity of the pump is thereupon automatically increased thus giving the engine decreased mechanical advantage with respect to the vehicle wheels or other driven members. The speed of the engine is thus decreased with resultant decreased suction which increases the manifold pressure to optimum.

With the load or resistance unchanged, an increase in throttle opening may cause the manifold pressure to rise above the optimum. Thereupon, the pump capacity is automatically decreased with resultant increase in engine speed, and the increased engine speed reduces the manifold pressure to optimum. Similarly, with the load or resistance unchanged, a decrease in throttle opening may cause the manifold pressure to fall below the optimum. Thereupon the pump capacity is automatically increased with resultant decrease in engine speed, and the decreased engine speed increases the manifold pressure to optimum.

For effecting the required changes in the pump capacity, there is preferably provided a chamber separate from the manifold and provided with a wall movable with respect to the pressure in the chamber. As shown, this chamber is a bellows 126 expansible and contractible in accordance with pressure therein so that its end wall 128 is movable in response to such pressure. The bellows 126 is connected with the engine intake manifold 16 by means of a duct 130 so that the pressure in the chamber varies with the manifold pressure. The duct 130 is preferably not connected with the manifold directly, but indirectly in a manner to be presently described.

A spring 132 in the bellows 126 tends to move the wall 128 in the outward direction. Connected with the wall 128 is a rod 134 which is connected with two movable plungers 136 and 138 constituting part of a servo-motor. The plungers 136 and 138 are movable in a chamber 140 to which fluid under pressure is supplied from a suitable source through a duct 142. Associated with the chamber 140 is a chamber 144 having a piston 146 longitudinally movable therein. The piston 146 is connected with the rod 122 which serves to adjust the capacity of the pump 24 in the manner already described. Extending from the chamber 140 to the chamber 144 is a duct 148 with a branch 150. Also extending from the chamber 140 to the chamber 144 is a duct 152 with a branch 154. Also connected with the chamber 140 is a drain duct 156 having two branches terminating at opposite sides of the plungers 136 and 138.

Fig. 2 shows the plungers 136 and 138 in the positions corresponding to the optimum pressure in the chamber 126 and therefore correponding to the optimum pressure in the manifold 16. It will be noted that in this position the ducts 148, 150, 152 and 154 are blocked and the piston 146 therefore remains stationary and the pump capacity remains unchanged. If, on account of a change in throttle opening or a change in load conditions, the pressure in the chamber 126 rises above the optimum, the wall 128 is moved toward the left carrying with it the plungers 136 and 138. This opens the ducts 154 and 148 and permits fluid under pressure to flow into the left side of the chamber 144 thus moving the piston 146 toward the right, which is the direction to decrease the capacity of the pump. Assuming that the position of the throttle is not further changed and that the operating conditions of the vehicle are not further changed, the decreased capacity of the pump gives the engine increased mechanical advantage, with the result that its speed is increased, thus reducing the pressure in the manifold to optimum and the pressure in the chamber 126 to optimum. Thereupon, the wall 128 and the plungers 136 and 138 return to the positions shown in Fig. 2 with the result that the ducts 148, 150, 152 and 154 are again blocked thus stopping further decrease in pump capacity.

If, on account of a change in throttle opening or a change in load conditions, the pressure in the chamber 126 falls below the optimum, the wall 128 is moved toward the right carrying with it the plungers 136 and 138. This opens the ducts 150 and 152 and permits fluid under pressure to flow into the right side of the chamber 144 to move the piston 146 toward the left, which is the direction to increase the capacity of the pump. Assuming that the position of the throttle is not further changed and that the operating conditions of the vehicle are not further changed, the increased capacity of the pump gives the engine decreased mechanical advantage with the result that its speed is decreased thus increasing the pressure in the manifold to optimum and the pressure in the chamber 126 to optimum. Thereupon, the wall 128 and plungers 136 and 138 return to the positions shown in Fig. 2 with the result that the ducts 148, 150, 152 and 154 are again blocked, thus stopping further increase in pump capacity.

It will be seen that the means above described serves to automatically adjust the capacity of the pump in such a way as to correspondingly adjust the speed of the engine to such an extent as to maintain the manifold pressure substantially at optimum. If there are any departures from optimum due to changes in the throttle opening or due to changes in the operating conditions of the vehicle, the pump capacity is immediately adjusted to compensate for the changed conditions and to restore the manifold pressure to optimum.

Due to changes in the type of fuel being used, or possibly to other factors, it may be desirable to change the optimum pressures which are maintained in the chamber 126 and in the manifold 16. In order that such adjustment may be made, a spring 158 is provided which exerts pressure on the plunger 138 in opposition to the pressure exerted by the spring 132 in the bellows 126. The pressure exerted by the spring 158 can be adjusted by means of a threaded cap 160. It will be seen that by adjusting the cap 160 the balance of pressures exerted by the two springs 158 and 132 can be changed so as to require more or less pressure in the bellows 126 to maintain the plungers 136 and 138 in the blocking positions shown in the drawing.

The automatic adjustment of the pump capacity to maintain an optimum manifold pressure is highly desirable during normal ranges of operating speeds of the vehicle. It may, however, be undesirable during starting and during low vehicle speeds. During starting and at low speeds it is desirable to maintain the pump at or near its minimum capacity so as to give the engine its maximum mechanical advantage, even though this may involve a substantial departure from the optimum manifold pressure. I therefore preferably provide means for rendering inoperative the means for adjusting the pump capacity to maintain an optimum manifold pressure, the aforesaid means being rendered so inoperative when the vehicle is stationary or operating at low speeds. Preferably the last said means is automatically rendered inoperative by means dependent on the speed of the vehicle. This means dependent on vehicle speed preferably also serves to automatically cause the adjustment of the pump to or near its minimum capacity under said conditions. The means utilized for the purpose last above described and responsive to vehicle speed may be widely varied but I prefer and have shown a means responsive to the rate of flow of fluid through the wheel motors, this rate of flow being obviously proportionate to the speed. I therefore provide a valve in one of the conduits between the pump and the wheel motors which automatically opens and closes in proportion to the rate of fluid flow, and in fact, I may use for this purpose the same valve 98 which has already been referred to as serving to prevent retrograde movement of the vehicle on a grade.

Connected with the valve 98 is an arm 162 connected by a link 164 with a control valve having two spaced plungers 166 and 168. A spring 170 tends to move the control valve in the direction corresponding to the closing movement of the valve 98. The duct 130, instead of being connected directly with the manifold, extends to the aforesaid control valve and when the control valve is in the position shown with the valve 98 closed, the duct 130 is connected with a vent 172 communicating with the atmosphere. Under these conditions the pressure in the chamber 126 is atmospheric pressure rather than manifold pressure and is therefore substantially above the predetermined optimum. As the valve 98 opens under the influence of increased fluid flow, the control valve is moved downward in opposition to the spring 170 with the result that the plunger 168 blocks the vent 172 and with the further result that the plunger 166 opens a duct 174 leading from the control valve to the intake manifold, or to the air intake 20 immediately adjacent the manifold. As soon as connection is established through the duct 174, the pressure in the chamber 126 corresponds to the pressure in the manifold.

It will be seen that when the vehicle is stationary or is operating at a speed below a predetermined critical speed, the control valve remains in a position to connect the chamber 126 with the atmosphere, thus maintaining the pressure therein substantially above optimum. The pressure being above optimum, the pump is adjusted to its minimum capacity in the manner already described. Thus, the engine has its maximum mechanical advantage for starting the vehicle and for operating it at low speeds. However, as soon as the critical speed is reached or passed, a connection is established between the chamber 126 and the manifold, and thereafter the chamber pressure is maintained at optimum in the manner already described.

The means for reversing the direction of movement of the wheel motors has been described, and it will be understood that it is ordinarily desirable to insure the operation of the vehicle in the reverse direction at low speeds only. To this end, a suitable restriction such as 176 is provided in the return conduit 48 through which the liquid flows when the reversing valve is in its reversing position. Inasmuch as the liquid can flow past the restriction 176 only at a relatively low rate the vehicle can be operated in the reverse direction only at low speeds.

The rate of fluid flow permitted by the restriction 176 is so small that the valve 98 will not open sufficiently to close the vent 172 and open the conduit 174. Thus, the pressure in the chamber 126 is above optimum during movement of the vehicle in the reverse direction and the pump is therefore maintained at minimum capacity, thus giving the engine its maximum mechanical advantage for operating the vehicle in the reverse direction.

The manner of operation of my improved power system for motor vehicles will be more fully understood from the following examples:

*Example 1.*—Assume the vehicle to be stationary with the engine idling, with the throttle in idling position, with the idle valve open, and with the pump at minimum capacity, and further assume no free-wheeling. To start and accelerate the vehicle, the following steps occur:

a. The brakes are released manually.
 b. Throttle 22 is partly opened manually.
 c. Idle valve 86 is closed.
 d. Engine speed is increased.
 e. Closing of idle valve causes fluid to flow through the wheel motors 28 to start the vehicle.
 f. Further manual opening of the throttle increases engine speed and vehicle speed until a critical speed is reached at which valve 98 causes the chamber 126 to be connected with manifold, the chamber pressure being reduced to a pressure corresponding with manifold pressure.
 g. Due to the high engine speed, the manifold and chamber pressures will be considerably below optimum and the pump capacity will be substantially increased, probably to maximum or near maximum, so as to decrease the engine speed sufficiently to increase the manifold and chamber pressures to optimum.
 h. If additional vehicle speed is required the throttle is further opened manually, thus increasing the manifold and chamber pressures above optimum.
 i. Engine speed tends to increase, but cannot increase except as permitted by increased speed of vehicle or by adjustment of pump. (*Note:* If pump capacity were fixed, vehicle and engine speeds would increase together, but due to increased load resulting from increased speed, the engine speed would not be increased sufficiently to bring the manifold pressure down to the optimum.)
 j. Vehicle speed is increased, but at the same time the pump capacity is decreased by reason of increased manifold pressure. Thus the engine speed is increased sufficiently to decrease the manifold pressure to optimum. (*Note:* The net result is that the increase in engine speed is more than proportionate to the increase in vehicle speed, thus restoring the manifold pressure to optimum.)

*Example 2.*—With the same assumptions as in Example 1, further assume that the reversing valve is in reversing position. To start and accelerate the vehicle the following steps occur:

a. The initial steps are the same as steps a, b, c, d, and e of Example 1, except that the restriction 176 insures the operation at low speeds only.
 b. Inasmuch as only low speeds are possible, the valve 98 does not open sufficiently to connect the chamber 126 with the manifold, and therefore the pump remains at minimum capacity.

*Example 3.*—Assume the vehicle to be operating at a speed well above the critical speed, with the throttle opened to a substantial extent and with the pump at an intermediate capacity, and further assume no free-wheeling. To decelerate and stop the vehicle the following steps occur:

a. Throttle is partly closed manually.

b. Manifold and chamber pressures are decreased below optimum.

c. Engine speed tends to decrease, but cannot decrease except as permitted by decreased speed of vehicle or by adjustment of pump. (Note: If pump capacity were fixed, vehicle and engine speeds would decrease together, but due to decreased load resulting from decreased speed, the engine speed would not be decreased sufficiently to bring the manifold pressure back to the optimum.)

d. Vehicle speed is decreased, but at the same time the pump capacity is increased by reason of the decreased manifold pressure. Thus the engine speed is decreased sufficiently to increase the manifold pressure to optimum. (Note: The net result is that the decrease in engine speed is more than proportionate to the decrease in vehicle speed, thus restoring the manifold pressure to optimum.)

e. When as the result of steps a, b, c and d the vehicle speed has been reduced below the critical speed, the valve 98 connects the chamber 126 with the atmosphere thus increasing its pressure above optimum.

f. Thereupon the pump capacity which was at or near maximum at the critical speed, is reduced to minimum as the result of the high chamber pressure.

g. Throttle is moved manually to its nearly closed idling position.

h. Idle valve is opened thus removing load from engine.

i. Engine operates at its idling speed.

j. Vehicle is stopped by brakes manually applied.

Example 4.—Assume vehicle to be operating at a speed above the critical speed with the manifold and chamber pressures at optimum, and that increased resistance is encountered without change in throttle opening. Thereupon the following steps occur:

a. Vehicle speed and engine speed are decreased.

b. Decreased engine speed causes increase of manifold and chamber pressures above optimum.

c. Pump capacity is decreased so as to increase the ratio of engine speed to vehicle speed, the resultant increased engine speed serving to decrease the manifold and chamber pressures to optimum.

If decreased resistance is encountered the results are opposite to those stated in steps a, b and c.

Example 5.—Assume vehicle to be operating at a speed above the critical speed without free-wheeling and with the manifold and chamber pressures at optimum, and that a downgrade is encountered for which it is desired to use the pump and engine for braking purposes. Thereupon the following steps occur:

a. The vehicle tends to operate at a speed higher than that corresponding to the rate of fluid flow from the pump, and the wheel motors act as pumps tending to accelerate the main pump and the engine, the pump and engine thus effecting braking.

b. If the throttle opening is unchanged, any increase in the engine speed due to this acceleration will cause a decrease in the manifold pressure below the optimum.

c. If the throttle opening is manually decreased, the pump is driven to an even greater extent by fluid from the motors, and the manifold and chamber pressures are decreased even further below optimum.

d. Pump capacity is increase so as to decrease the ratio of engine speed to vehicle speed, the resultant decreased engine speed serving to increase the manifold and chamber pressures to optimum. If this effect continues, the pump capacity may reach maximum, after which further increases in vehicle speed and consequently in engine speed will only serve to further decrease the manifold pressure.

e. On account of the increased speed ratio the braking effect of the pump and engine is decreased but is nevertheless substantial.

f. If the throttle is moved to its idling position so that the idle valve is opened, this does not interfere with the braking action, and may even increase it on account of reduction of fluid pressure at the intake sides of the motors.

Example 6.—Assume the vehicle to be operating at a speed well above the critical speed, with the throttle opened to a substantial extent and with the pump at an intermediate capacity, and assume that the free-wheeling valve is in free-wheeling position. Further assume that a down grade is encountered. Thereupon the following steps occur:

a. Throttle opening is manually decreased to prevent engine from racing.

b. Vehicle operates freely without any braking action by pump and engine. Fluid in excess of that required by the pump at its then existing speed and capacity, is by-passed through the conduits 72 and 78.

c. If the throttle is moved manually to its idling position so as to open the idle valve, the manifold and chamber pressures may be reduced substantially below optimum.

d. The pump capacity will be increased, perhaps to its maximum.

e. When the throttle is manually opened to enable the engine to again pick up the load of driving the vehicle, the pump capacity will be adjusted as already described to restore the manifold and chamber pressures to optimum.

While I have shown and described a certain preferred embodiment of my invention, modifications thereof will readily occur to those skilled in the art, and I therefore intend my invention to be limited only by the appended claims.

What I claim is:

1. In a motor vehicle having fluid operated motor means mechanically connected with the vehicle wheels, pump, an internal combustion engine for operating the pump, two conduits serving respectively for delivering fluid from the pump to the motor means and for returning fluid from the motor means to the pump, the combination of an idling by-pass fluid circuit connecting the two aforesaid conduits, an idle valve in said circuit normally closed but adapted to be opened to permit the pump to operate without load during idling of the engine, and an automatic one-way check valve in said circuit preventing reverse flow of fluid therethrough when the idle valve is open whereby said pump and engine operate as a brake for said wheels when said motor means and wheels tend to run faster than said pump and engine.

2. In a motor vehicle having fluid operated motor means mechanically connected with the vehicle wheels, a pump, an internal combustion engine for operating the pump, a throttle for controlling the admission of combustion air to the engine, two conduits serving respectively for delivering fluid from the pump to the motor means and for returning fluid from the motor means to the pump, the combination of a by-pass fluid circuit connecting the two aforesaid conduits, an idle valve in said circuit, a connection between said valve and the throttle for maintaining said valve open when the throttle is in its idling position and for maintaining said valve in closed position when the throttle is opened beyond its idling position, and an automatic one-way check valve in said by-pass circuit preventing reverse flow of fluid therethrough when said idle valve is open whereby said pump and engine operate as a brake for said wheels when said motor means and wheels tend to run faster than said pump and engine.

3. In a motor vehicle having fluid operated motor means mechanically connected with the vehicle wheels, a pump, an internal combustion engine for operating the pump, conduits for delivering fluid from the pump to the motor means and for returning fluid from the motor means to the pump, the combination of a reservoir for fluid, a conduit from the delivery side of the pump to the reservoir, a conduit from the reservoir to the intake side of the pump, an idle valve in the conduit from the pump to the reservoir normally closed but adapted to be opened to permit the pump to operate without load during idling of the engine, and an automatic one-way check valve in the conduit from the reservoir to the pump preventing reverse flow of fluid therethrough when the idle valve is open whereby said pump and engine operate as a brake for said wheels when said motor means and wheels tend to run faster than said pump and engine.

4. In a motor vehicle having fluid operated motor means mechanically connected with the vehicle wheels, a pump, an internal combustion engine for operating the pump, a throttle for controlling the admission of combustion air to the engine, two conduits serving respectively for delivering fluid from the pump to the motor means and for returning fluid from the motor means to the pump, the combination of a by-pass fluid circuit connecting the two aforesaid conduits, an idle valve in said circuit normally closed but adapted to be opened to permit the pump to operate without load during idling of the engine, and an automatic one-way check valve in the conduit from the pump to the motor means between said by-pass circuit and the motor means, the said check valve serving to prevent reverse flow of fluid through the conduits and thus restrict movement of the vehicle in the direction opposite to the normal direction of movement.

5. In a motor vehicle having fluid operated motor means mechanically connected with the vehicle wheels, a pump, an internal combustion engine for operating the pump, a throttle for controlling the admission of combustion air to the engine, two conduits serving respectively for delivering fluid from the pump to the motor means and for returning fluid from the motor means to the pump, the combination of an idling by-pass fluid circuit connecting the two aforesaid conduits, an idle valve in said circuit normally closed but adapted to be opened to permit the pump to operate without load during idling of the engine, an automatic one-way check valve in the conduit from the pump to the motor means between the idling by-pass and the motor means, the said check valve serving to prevent reverse flow of fluid through the conduits and thus restrict movement of the vehicle in the direction opposite to the normal direction of movement, and an automatic one-way check valve in said idling by-pass circuit preventing reverse flow of fluid therethrough when the idle valve is open whereby said pump and engine operate as a brake for said wheels when said motor means and wheels tend to run faster than said pump and engine.

6. In a motor vehicle having fluid operated motor means mechanically connected with the vehicle wheels, a pump, an internal combustion engine for operating the pump, conduits for delivering fluid from the pump to the motor means and for returning fluid from the motor means to the pump, the combination of means, including a reversing valve, for reversing the flow through portions of the said conduits to cause the motor means and the vehicle to operate either in the forward direction or in the reverse direction, and means for restricting the flow of fluid through the conduits when the valve is in position for operating the motor means and the vehicle in the reverse direction.

7. In a motor vehicle having fluid operated motor means mechanically connected with the vehicle wheels, a pump, an internal combustion engine for operating the pump, conduits for delivering fluid from the pump to the motor means and for returning fluid from the motor means to the pump, the combination of means, including a reversing valve, for reversing the flow through portions of the said conduits to cause the motor means and the vehicle to operate either in the forward direction or in the reverse direction, and a means in one of the conduits and separate from the reversing valve for restricting the flow of fluid through the conduits when the valve is in position for operating the motor means and the vehicle in the reverse direction.

8. In a motor vehicle having fluid operated motor means mechanically connected with the vehicle wheels, a variable capacity pump, an internal combustion engine for operating the pump, conduits for delivering fluid from the pump to the motor means and for returning fluid from the motor means to the pump, the combination of means, including a reversing valve, for reversing the flow through portions of the said conduits to cause the motor means and the vehicle to operate either in the forward direction or in the reverse direction, and automatically acting means for causing the pump to operate at less than its maximum capacity when the motor means and the vehicle are operating in the reverse direction.

9. In a motor vehicle having fluid operated motor means mechanically connected with the vehicle wheels, a variable capacity pump, an internal combustion engine for operating the pump, conduits for delivering fluid from the pump to the motor means and for returning fluid from the motor means to the pump, the combination of means, including a reversing valve, for reversing the flow through portions of the said conduits to cause the motor means and the vehicle to operate either in the forward direction or in the reverse direction, means for restricting the flow of fluid through the conduits when the valve is in position for operating the motor means and the vehicle in the reverse direction, and means dependent on the reduced rate of flow of fluid through the conduits for automatically reducing the capacity of the pump to its minimum value when the motor means and the vehicle are operating in the reverse direction.

10. Control apparatus for an internal combustion engine driving a load device through a variable ratio transmission, comprising means for varying the ratio of said transmission, reversible motor means for positioning said ratio varying means, control means for said motor means having a control element movable along a predetermined path, said control means being effective when said control element is in a predetermined neutral position along said path to cause said motor means to remain stationary, and effective upon opposite movements of said element from said position to cause movement of said motor means in opposite directions, and means responsive to the pressure in the intake manifold of said engine for positioning said element, said pressure responsive means being effective when said pressure is at a predetermined value to maintain said element at said predetermined position, and effective upon deviation of said pressure from said value to move said element in a direction to cause variation of said transmission ratio in a sense to restore said pressure to said predetermined value.

11. Control apparatus as in claim 10, in which said pressure responsive means includes an expansible chamber connected to said intake manifold and having a movable wall connected to said control element.

12. Control apparatus as in claim 11, including spring means opposing motion of said element by said movable wall, and means for adjusting the force of said spring means to determine the value of manifold pressure at which said element is in said predetermined neutral position.

13. Control apparatus as in claim 10, including throttle means for controlling the flow of combustion air into said intake manifold.

14. Control apparatus as in claim 10, in which said control means responds to an increase in intake manifold pressure above said value to operate said transmission ratio varying means in a ratio increasing sense until said pressure is restored to said value, and responds to a decrease in pressure below said value to operate said ratio varying means in a ratio decreasing sense until said pressure is restored to said value.

15. Control apparatus for an internal combustion engine driving a load device through a variable ratio transmission, comprising means for varying the ratio of said transmission, reversible motor means for positioning said ratio varying means, control means for said motor means having a control element movable along a predetermined path, said control means being effective when said control element is in a predetermined position along said path to cause said motor means to remain stationary, and effective upon opposite movements of said element from said position to cause movement of said motor means in opposite directions, and means responsive to the pressure in the intake manifold of said engine for positioning said element, said pressure responsive means being effective when said pressure is at a predetermined value to maintain said element at said predetermined position, and effective upon deviation of said pressure from said value to move said element in a direction to cause variation of said transmission ratio in a sense to restore said pressure to said predetermined value; and selector valve means associated with said element positioning means and movable between a first starting position, wherein said element positioning means is subjected to a pressure greater than the manifold pressure and moves said element to a ratio increasing position independently of the existing manifold pressure, and a second running position, wherein said element positioning means is subjected to the manifold pressure and moves said element in accordance with the manifold pressure.

16. Control apparatus for an internal combustion engine driving a load device through a variable ratio transmission, comprising means for varying the ratio of said transmission, reversible motor means for positioning said ratio varying means, control means for said motor means having a control element movable along a predetermined path, said control means being effective when said control element is in a predetermined neutral position along said path to cause said motor means to remain stationary, and effective upon opposite movements of said element from said position to cause movement of said motor means in opposite directions, and means responsive to the pressure in the intake manifold of said engine for positioning said element, said pressure responsive means being effective when said pressure is at a predetermined value to maintain said element at said predetermined position, and effective upon deviation of said pressure from said value to move said element in a direction to cause variation of said transmission ratio in a sense to restore said pressure to said predetermined value; selector valve means operatively associated with said element positioning means, and means biasing said selector valve means to a first starting position, and means responsive to the speed of said load device for moving said selector means to a second running position against said biasing means when the speed of said load device exceeds a predetermined value.

17. Control apparatus for an internal combustion engine driving a load device through a variable ratio transmission, comprising means for varying the ratio of said transmission, reversible motor means for positioning said ratio varying means, control means for said motor means having a control element movable along a predetermined path, said control means being effective when said control element is in a predetermined neutral position along said path to cause said motor means to remain stationary, and effective upon opposite movements of said element from said position to cause movement of said motor in opposite directions, and means responsive to the pressure in the intake manifold of said engine for positioning said element, said pressure responsive means being effective when said pressure is at a predetermined value to maintain said element at said predetermined position, and effective upon deviation of said pressure from said value to move said element in a direction to cause variation of said transmission ratio in a sense to restore said pressure to said predetermined value; said transmission including a hydraulic pump driven by said engine and supplying motive fluid to a hydraulic motor which drives said load device, and in which said speed responsive means is responsive to the rate of flow of fluid through said hydraulic motor.

18. Control apparatus for an internal combustion engine driving a load device through a variable ratio transmission, comprising means for varying the ratio of said transmission, reversible motor means for positioning said ratio varying means, control means for said motor means having a control element movable along a predetermined path, said control means being effective when said control element is in a predetermined neutral position along said path to cause said motor means to remain stationary, and effective upon opposite movements of said element from said position to cause movement of said motor means in opposite directions, and means responsive to the pressure in the intake manifold of said engine for positioning said element, said pressure responsive means being effective when said pressure is at a predetermined value to maintain said element at said predetermined position, and effective upon deviation of said pressure from said value to move said element in a direction to cause variation of said transmission ratio in a sense to restore said pressure to said predetermined value; selector valve means operatively associated with said element positioning means, a check valve between said pump and motor for preventing reverse flow of fluid from said motor toward said pump, and means connecting said check valve to said selector valve means so that said check valve serves as the speed responsive means for operating said selector means.

19. Control apparatus for an internal combustion engine driving a load device through a variable ratio transmission, comprising means for varying the ratio of said transmission, reversible motor means for positioning said ratio varying means, control means for controlling the movement of said motor means, and a selector valve means operatively connected with said control means, whereby when said selector valve is in a first starting position said control means is operated so as to move said motor means to a ratio increasing position, and when said selector valve is in a second running position said control means is responsive to an operating condition of said engine.

20. Control apparatus for a variable ratio transmission driving a load device, comprising means for varying the ratio of said transmission, control means for controlling the operation of said ratio varying means, a selector means operatively associated with said control means and movable between a first starting position, wherein said selector means operates said control means to increase said ratio, and a second running position wherein said control means is free to move independently of said selector means, means biasing said selector means to said first starting position, and means responsive to the speed of said load device for moving said selector means to said second position against said biasing means when said speed exceeds a predetermined value.

21. A hydraulic transmission for connecting a prime mover with a load device, comprising a fluid pump, a fluid motor, supply and return conduits connecting said pump and motor, a by-pass fluid circuit connecting the pump outlet to the pump inlet, a valve in said by-pass circuit effective when open to permit flow therethrough so that said pump may operate without causing operation of said motor, and a check valve in said by-pass circuit for preventing flow from said inlet to said outlet therethrough, so that said motor may not operate without causing operation of said pump.

22. A hydraulic transmission for connecting a prime mover with a load device, comprising a fluid pump, a fluid motor, supply and return conduits connecting said pump and motor, a by-pass fluid circuit connecting the pump outlet to the pump inlet, a valve in said by-pass circuit effective when open to permit flow therethrough so that said pump may operate without causing operation of said motor, a check valve in said supply conduit between said by-pass circuit and said motor for preventing reverse flow therethrough, so that opening of the by-pass valve will not permit reverse operation of the motor.

23. In a motor vehicle driven by an internal combustion engine having an intake manifold, the combination of a variable speed power transmission between the engine and the driving wheels of the vehicle, and means responsive to the pressure in said manifold for automatically varying the power transmission to change the ratio between the engine speed and the vehicle speed so as to maintain the manifold pressure at a predetermined optimum value throughout a predetermined range of vehicle speeds.

24. In a motor vehicle driven by an internal combustion engine having an intake manifold and a throttle for controlling the admission of air to the manifold, the combination of a variable speed power transmission between the engine and the driving wheels of the vehicle, and means responsive to the pressure in said manifold for automatically varying the power transmission to change the ratio of engine speed to vehicle speed so as to maintain the manifold pressure substantially at a predetermined optimum value for various throttle positions and throughout a predetermined range of vehicle speeds.

25. In a motor vehicle driven by an internal combustion engine having an intake manifold, the combination of a variable speed power transmission between the engine and the driving wheels of the vehicle, means responsive to the pressure in said manifold for automatically varying the power transmission to change the ratio of engine speed to vehicle speed so as to maintain the manifold pressure substantially at a predetermined optimum value throughout a predetermined range of vehicle speeds, and means for automatically preventing the operation of said transmission varying means when the speed of the vehicle is below a predetermined critical speed and then maintaining a relatively high speed ratio between the engine speed and the vehicle speed.

26. In a motor vehicle driven by an internal combustion engine having an intake manifold, the combination of a variable speed power transmission between the engine and the driving wheels of the vehicle, means responsive to the pressure in said manifold for automatically varying the power transmission to change the ratio of engine speed to vehicle speed so as to maintain the manifold pressure substantially at a predetermined optimum value throughout a predetermined range of vehicle speeds, and means for manually adjusting the said optimum manifold pressure.

27. In a motor vehicle driven by an internal combustion engine having an intake manifold and a throttle for controlling the admission of air to said manifold, said vehicle having hydraulic motor means mechanically connected with the vehicle wheels, the combination of an hydraulic variable speed power transmission comprising a variable capacity pump driven by the engine, conduits for delivering liquid from said pump to said motor means and for returning liquid from said motor means to said pump, and means responsive to the pressure in said manifold for automatically changing the pump capacity and thereby changing the ratio between the engine speed and the vehicle wheel speed so as to maintain the manifold pressure at a predetermined optimum value for various throttle positions and throughout a predetermined range of vehicle speeds.

28. The combination according to claim 27, including means for automatically preventing the operation of said pump capacity changing means when the speed of the vehicle is below a predetermined critical speed and then maintaining a relatively high speed ratio between the engine speed and the vehicle speed.

TRENT H. HOLMES.

REFERENCES CITED

The following references are of record in the file of this patent:

UNITED STATES PATENTS

| Number | Name | Date |
|---|---|---|
| 732,908 | Thomson | July 7, 1903 |
| 967,565 | Rohan | Aug. 16, 1910 |
| 1,354,777 | Rock | Oct. 5, 1920 |
| 1,606,913 | Atzberger | Nov. 16, 1926 |
| 2,054,570 | Burt | Sept. 15, 1936 |
| 2,099,630 | Schneider | Nov. 16, 1937 |
| 2,190,122 | Mohler | Feb. 13, 1940 |
| 2,221,308 | Dischert | Nov. 12, 1940 |
| 2,255,783 | Kendrick | Sept. 16, 1941 |
| 2,361,098 | Higby | Oct. 24, 1944 |
| 2,365,987 | Zimmerman | Dec. 26, 1944 |
| 2,393,882 | Blair | Jan. 29, 1946 |